United States Patent [19]
Nakanishi et al.

[11] Patent Number: 5,329,406
[45] Date of Patent: Jul. 12, 1994

[54] PLASTIC OPTICAL ELEMENTS AND A MOLDING MOLD THEREFOR

[75] Inventors: Hiroshi Nakanishi, Tokyo; Yoshito Matsuoka, Utsunomiya; Yoichi Shibata, Tochigi; Toshiaki Magome, Mooka; Takashi Ubagai, Utsunomiya, all of Japan

[73] Assignee: Canon Kabushiki Kaisha, Tokyo, Japan

[21] Appl. No.: 921,641

[22] Filed: Jul. 30, 1992

[30] Foreign Application Priority Data

Jul. 31, 1991 [JP] Japan ............................ 3-213152

[51] Int. Cl.⁵ .............................................. G02B 7/02
[52] U.S. Cl. .................................. 359/811; 359/819; 359/642; 264/1.2
[58] Field of Search ............... 359/819, 820, 811, 642, 359/664, 668, 823; 264/1.2, 2.2, 2.3, 2.4

[56] References Cited

U.S. PATENT DOCUMENTS

| | | | |
|---|---|---|---|
| 3,205,774 | 9/1965 | Estes | 359/820 |
| 4,861,137 | 8/1989 | Nagata | 359/820 |
| 4,886,342 | 12/1989 | Kudo et al. | 359/819 |
| 5,067,800 | 11/1991 | Shirakawa | 359/642 |
| 5,103,438 | 4/1992 | Masunaga et al. | 359/823 |

FOREIGN PATENT DOCUMENTS 61-233520  10/1986  Japan .

*Primary Examiner*—Loha Ben
*Attorney, Agent, or Firm*—Fitzpatrick, Cella, Harper & Scinto

[57] ABSTRACT

There are provided a plastic molded optical element and a molding mold therefor capable of preventing flash generation as well as making the handling of the molded optical element easy by forming a projection on the main body of an optical element, corresponding to the matching portions (parting planes) of the molding members of the molding mold or die members for molding the optical element. A thin projection is formed on the main body of the optical element in a thickness required for securing a required strength in relation to the matching portions (parting planes) of the molding members or die member for molding the optical element.

8 Claims, 7 Drawing Sheets

FIG. IA
FIG. IB
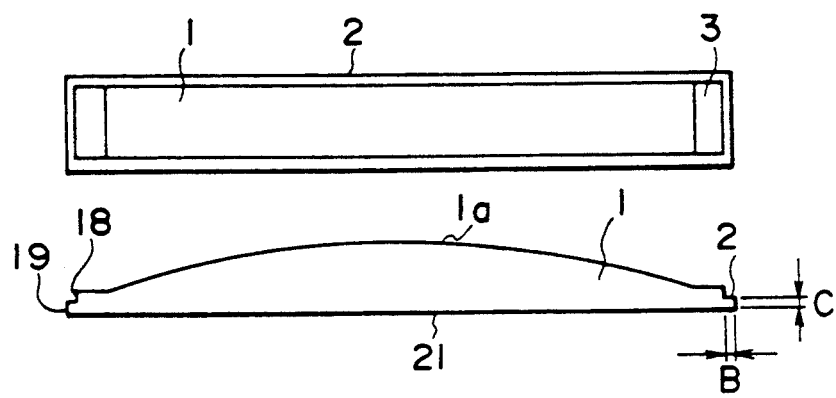
FIG. 2
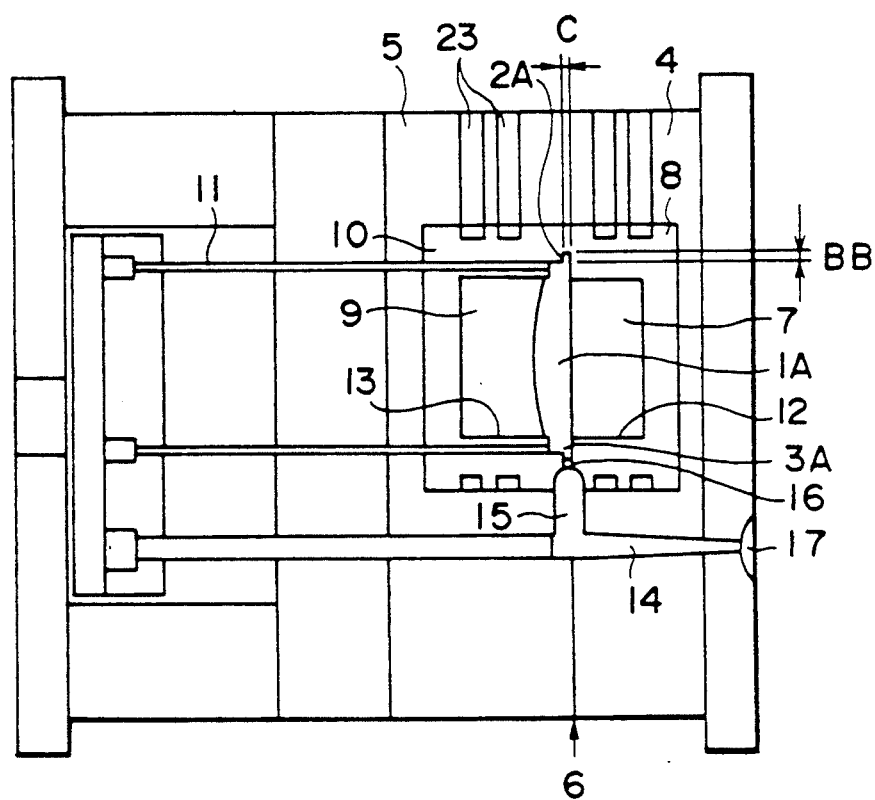

FIG. 3A
PRIOR ART
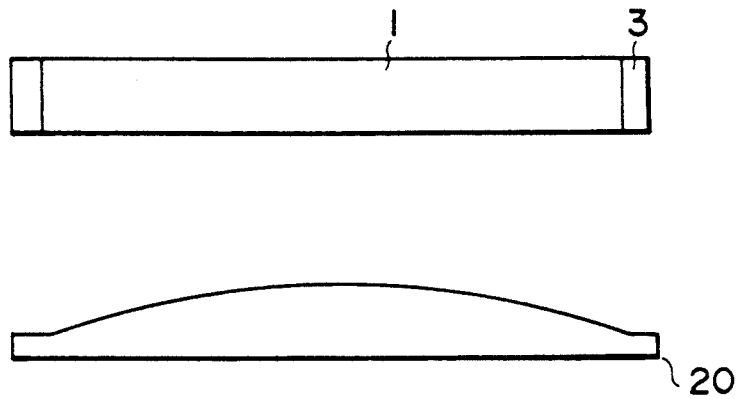
FIG. 3B
PRIOR ART
FIG. 4
PRIOR ART
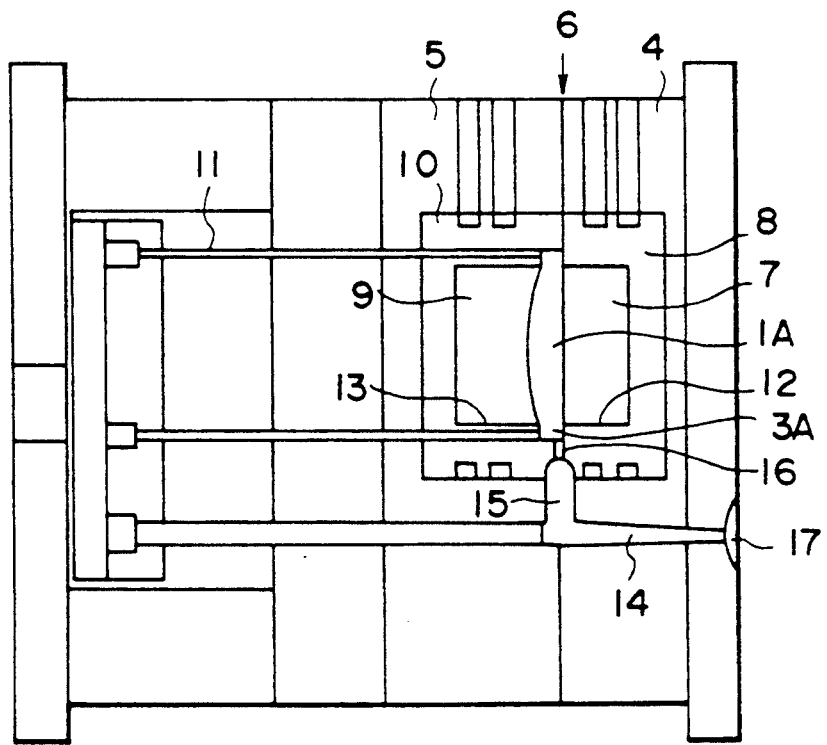

FIG. 7
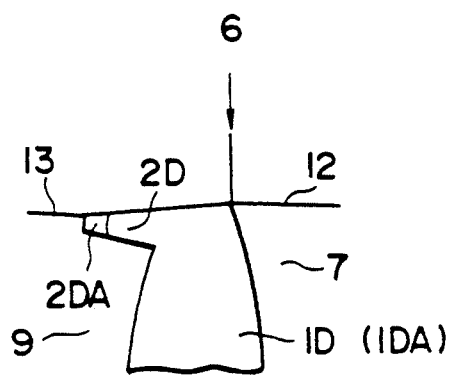
FIG. 8A
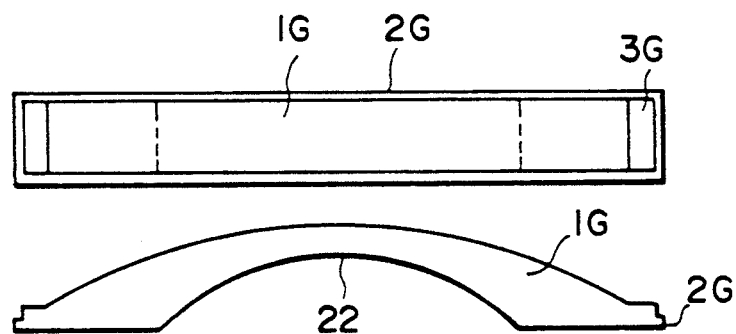
FIG. 8B

FIG. 9
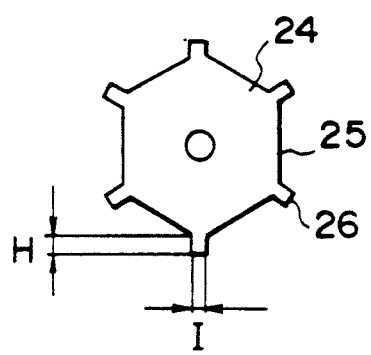
FIG. 10A
FIG. 10B
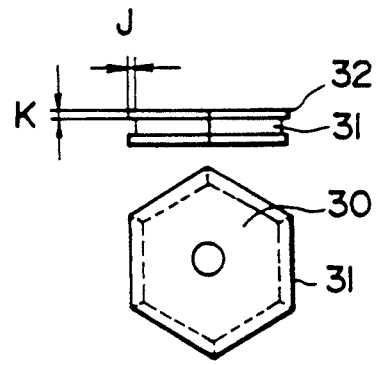
FIG. 11
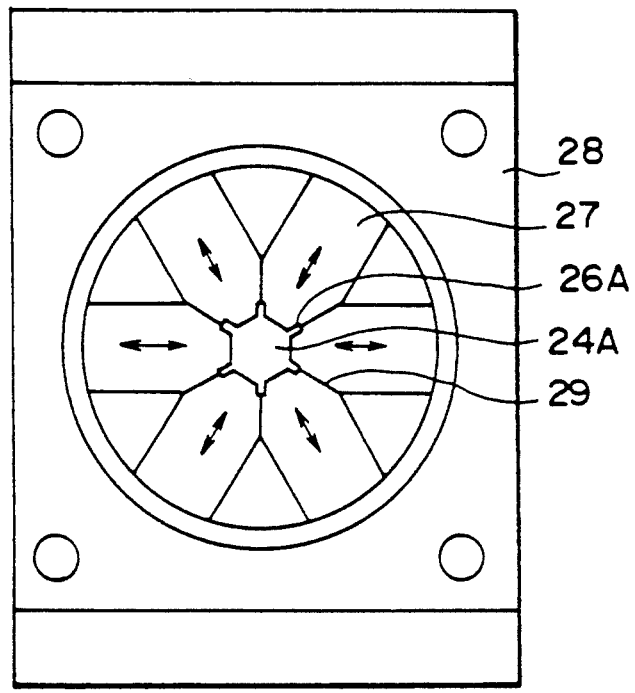

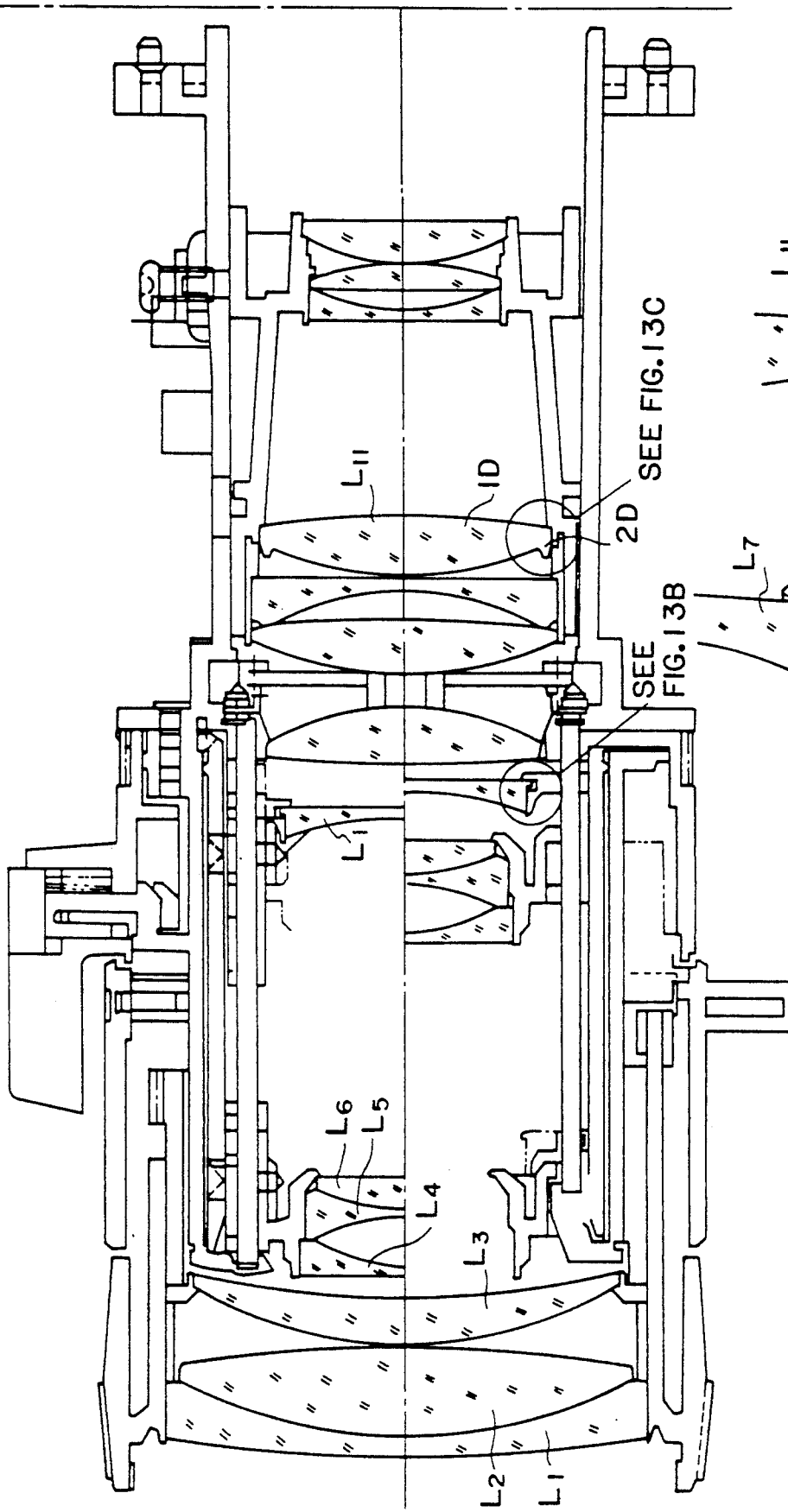
FIG. 13A
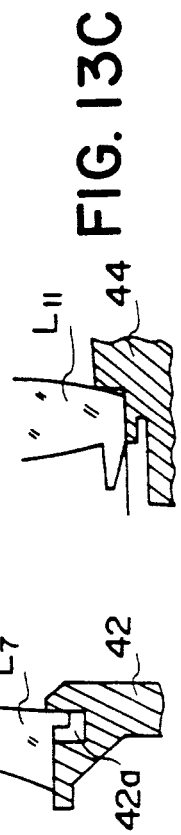
FIG. 13C
FIG. 13B

PLASTIC OPTICAL ELEMENTS AND A MOLDING MOLD THEREFOR

BACKGROUND OF THE INVENTION

1. Field of the Invention

The present invention relates to plastic molded optical elements comprising mainly lens, prism, mirror (including polygonal mirror) and other optical elements using plastic resin, and a molding mold therefor.

2. Related Background Art

Traditionally, plastic lenses and other plastic molded optical elements have been manufactured by the use of injection molding, injection compression molding, and other molding methods. Unlike general plastic molded products, these plastic molded optical elements require a higher accuracy for the total dimensional precision and machining precision in consideration of optical functions, and others. In order to meet such accuracy requirements, a higher molding pressure is adopted than the one for the usual plastic molding for the purpose of compensating for resin shrinkage, for example. (Whereas the molding pressure for general plastic molded products is approximately several hundreds $kg/cm^2$ it is 1,000 $kg/cm^2$ or higher for the plastic molded optical elements. ) Thus, the transfer of the cavity configuration of a molding mold is made possible with better fidelity.

Also, as disclosed in Japanese Patent Laid-Open Application No. 61-233520, it is arranged to conduct a transfer of the cavity configuration with more desirable fidelity in producing plastic optical elements by increasing the temperature of a molding mold, particularly the temperature around its cavity, to more than the glass-transition temperature of the resin before molten resin is injected into the molding mold, so that the viscosity of the resin is prevented from being rapidly lowered after the resin is injected into the mold.

Nevertheless, in the above-mentioned conventional example, depending on the processing pressure, temperature conditions of the molding mold, and others, there are generated molding flashes on the matching portion (parting planes) on the circumference of the cavity of the molding mold for forming the main body of the optical element and on the matching portion of the die constituting a part of the molding mold or on the matching portion between the dies and the mold members. The "molding flash" is fundamentally a portion which is not anticipated to be formed in performing the molding operation, and is structured to be extremely thin. As a result, in the processes of handling the molded plastic optical elements, the flashes are peeled off from the main body of the optical elements to adhere to the optically functional planes thereof, for example, thus creating the lowered resolution power and other degradations of the optical performance. Also, because of the need to avoid peeling off the flashes, it is difficult for transportation hands and other mechanical robots to access the optical elements.

Traditionally, therefore, it has been the practice that a sufficient mold clamping force is given to the molding mold, or that machining precisions for each molding member and die are increased so that no flashes may take place at the matching portions of the mold members and the dies. For example, the machining precision is defined to be a super-high precision of 5 $\mu$m or less, or a shrink fitting or other means is practiced. However, if the mold clamping force is increased as above, an excessive load is given to the mold resulting in a distortion of the mold when repeatedly used, which leads to another problem of reducing the durability of the mold. Also, increasing the machining precision for the molding members has brought a problem of a high cost in manufacturing as well as an enormous time required for machining them.

SUMMARY OF THE INVENTION

The present invention has been made in consideration of the above-mentioned situation, and it is an object to provide a plastic molded optical element capable of preventing the generation of flashes and of making the handling of the molded optical element easy by forming a projection on the main body of the optical element corresponding to the matching portions (parting planes) of the mold members of the molding mold or the dies when the plastic molding of the main body of the optical element is performed, and a molding mold therefor.

In order to achieve this, in a plastic molded optical element according to the present invention, a thin projection which is big enough to secure a required strength is formed on the main body of the optical element, corresponding to the matching portions (parting planes) of the mold members or dies in the molding mold for plastic-molding the main body of the optical element.

Also, in the molding mold for the optical element, there is provided a groove big enough to enable a groove provided on matching portions of molding members or die members around a cavity formed by the molding members or the die members for plastic-molding the optical element such that a projection is formed on the main body of the optical element formed in the cavity.

BRIEF DESCRIPTION OF THE DRAWINGS

FIGS. 1A and 1B are views showing a first embodiment of an optical element according to the present invention.

FIG. 2 is a view showing a molding mold for the above-mentioned embodiment.

FIGS. 3A and 3B are views showing a conventional optical element.

FIG. 4 is a view showing a molding mold for the above-mentioned conventional optical element.

FIG. 7 is a partial enlargement of the molded product by the molding mold shown in FIG. 6.

FIGS. 8A and 8B are views showing still another embodiment according to the present invention.

FIG. 9 is a view showing a further embodiment according to the present invention.

FIGS. 10A and 10B are views showing still a further embodiment according to the present invention.

FIG. 11 is a view showing a molding mold for the embodiment shown in FIG. 9.

FIGS. 13A, 13B and 13C are views showing an example in which the optical elements according to the present invention are assembled into a final product.

DETAILED DESCRIPTION OF THE PREFERRED EMBODIMENTS

Figure 5A:
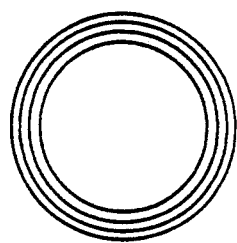
FIGS. 5A and 5B are views showing another embodiment according to the present invention.

Hereinafter, with reference to the accompanying drawings, the specific description will be made of the embodiments according to the present invention. In FIGS. 1A and 1B, there is shown a first embodiment of a plastic molded optical element according to the present invention, in which a reference numeral 1 designates a main body of the optical element, and 2 is a projection formed accompanying the main body of the optical element produced according to the present invention. In the present embodiment, the curved surface 1a of the main body 1 has a toric face formed with different curvatures in two orthogonal directions.

In order to obtain such a plastic molded optical element, a molding mold structured as shown in FIG. 2 is used. A reference numeral 4 designates a fixed side molding frame, 5 is a movable side molding frame, and 6 is a matching portion of the fixed side molding frame and movable side molding frame, which is generally called a parting plane (mold parting planes).

A reference numeral 7 designates a mirror die provided on the inner side of the fixed side molding frame 4 for constructing the lens plane of the molded optical element, and 9 is another mirror die provided on the inner side of the movable side frame 5 for constructing the lens plane, both being embedded in mold members 8 and 10 positioned in each molding frame. Also, in said mold members 8 and 10, staged portions 3A are formed for a flange 3 which will provide fiducial location when the optical element is assembled into a final optical product, in relation to the ejecting places of the ejector pins 11 used for ejecting the optical element from the molding mold. A cavity 1A formed by the molding members 8 and 10 is structured inside the staged portions 3A, and corresponds to the parting plane of the mirror dies 7 and 9.

In the present embodiment, the mirror dies 7 and 9 are fitted into the molding members 8, 10 by means of shrink fitting or the like, respectively, at matching portions (parting planes 12, 13) between the mirror dies 7, 9 and the molding members 8, 10 housing them. As a result, there are substantially no gaps between them.

Usually, therefore, the flashes generated in the molding mold for the optical element take place in the locations of the matching portions 6 (these being also the parting planes of the molding members 8 and 10 of the fixed side molding frame 4 and the movable side molding frame 5, and matching portions 12 and 13 between the mirror dies 7 and 9 and the molding members 8 and 10. In the embodiment, there is provided a countermeasure against the generation of flashes, particularly in the matching portion 6. This is implemented as shown in FIG. 2 by providing grooves 2A along the parting planes 6 at the leading ends of the stage portions 3A surrounding the cavity 1A.

Now, in comparing with the prior art (FIG. 3A, 3B and FIG. 4), generating processes of the flashes in an actual molding operation and how to avoid such flash generation according to the present invention will be described about a plastic molded optical element (FIG. 1) and a molding mold therefor (FIG. 2) as examples.

Here, the resin for molding is thermally molten in a cylinder (not shown) of a molding machine (acrylic resin, PMMA, or the like at 250° C., for example) is injected into the molding mold from a portion indicated by a reference numeral 17 through a spool 14, runner 15, and gate 16. A temperature control is given sufficiently around the cavity 1A (120° C. to 150° C., for example) by a medium supplied to the temperature controlling groove 23 prior to the injection.

As described earlier, when the optical element is molded, the molten resin is injected into the mold under a higher injection pressure than that upon molding of general plastic product, in order to transfer the cavity configuration in a better fidelity. Also, for the same reason, the temperature of the molding mold is raised over the glass transition temperature of the injecting resin (120° C., for example) in advance in order to prevent the rapid reduction of the viscosity after the resin has been injected into the mold. Generally, in this respect, it is not a practice to raise the temperature of the molding mold over the temperature at which its flow begins (=is suspended) (150° C., for example) because such a temperature rise results in a disadvantage in relation to the molding cycle including cooling step.

A sufficient mold clamping force is exerted by a mold clamping device (not shown) of a molding machine so as to meet the conditions. Nevertheless, although just an instant during the injection filling, a gap is inevitably caused to take place on the parting planes 6 between the fixed side molding member 8 and the movable side molding member 10 due to a high injecting pressure of the pressurized resin which has been injected into the cavity 1A. Therefore, in a case of molding by a conventional molding mold, the molten resin is filled in the gap by the additional cause of a high temperature of mold, hence resulting in the generation of flash as indicated by a reference numeral 20 in FIG. 3B. Although depending on the kinds of resin to be used for molding, the resin used for molding the optical element has often a low viscosity. If, for example, acrylic resin or polycarbonate resin is used, its molten resin is filled in the gap to become flash even when the gap is as small as approximately 15 μm.

However, according to our knowledges obtained by our earnest efforts, it has been found that if a groove 2A is provided in connection to the cavity 1A (or the stage portions 3A on its circumference) along the parting planes of the molding mold as the present invention (FIG. 2), the resin is rapidly cooled during flowing of the resin into the narrow places of the groove 2A even when a gap takes place between the fixed side molding member 8 and the movable side molding member 10, so that the resin has been solidified before it reaches the leading end of the groove 2A and no flash is generated.

In this respect, according to our experiences, it has been found that there are specific relations between the shape of the groove 2A (depth and length) and the effect in preventing the generation of flashes, and the strength of the projection 2 to be formed in the groove 2A when the resin becomes the optical element in the molding mold. The depth of the processing portion of the groove 2A means the thickness of the projection of the optical element, that is, a dimension indicated by a reference mark C in FIG. 1B. The length means likewise a dimension indicated by B in FIG. 1B in the direction projecting from the main body of the optical element.

If the processing portion of the groove 2A is too deep or its length is too short, the resin flows to the leading end of the groove 2A before it becomes sufficiently solidified in the groove 2A, so there is a possibility that the flash is generated at the end in the same manner as in the prior art. Also, on the contrary, if the groove 2A is shallow or its length is long, the thickness of the projection of the molded optical element becomes thin or its length becomes long. Thus, when such optical element thus molded is handled by a mechanical hand or the like, it tends to be broken due to its insufficient strength, and there is a possibility that the broken pieces of projection adhere to the optically functional plane.

As described earlier, the problem of flashes is that the flashes are peeled off from the main body of the optical element to adhere to the optically functional plane of the optical element, thereby causing the reduced resolution and other degradation of its optical performance, and that it makes the access to the optical element difficult when it is transported by a mechanical hand or the like without touching the flashes. Therefore, even if the generation of flashes could be avoided beyond the processing portion of the groove by providing the groove 2A, there would be no meaning of the measure in a case wherein the projection of the molded optical element becomes easily broken.

Therefore, as a result of our studies, it is found that if, in practice, the depth of the groove 2A is less than 0.5 mm and the length thereof is more than 0.3 mm, there is no possibility that any flashes can be generated beyond the processing portion of the groove. Also, it is recognized that there is essentially no problem as to the strength of the projection formed on the molded optical element if the thickness C of the projection is more than 0.05 mm and its length B is less than 2 min.

In this respect, it is unnecessary that a length BB of the processing portion of the groove 2A, corresponding to the length B of the projection 2, have a maximum of 2 mm. This is because the flow of the resin stops at the leading end of the groove 2A or halfway in the processing portion of the groove 2A. Therefore, we consider the maximum value for the length of the processing portion of the groove can be suitably specified in accordance with the resin to be used and molding conditions. Also, if the thickness C of the projection 2 is approximately 0.05 mm to 0.1 mm, the projection cannot be strong enough and tends to be broken, therefore, it is desirable to apply so-called treatment of chamfering to a root of the projection, that is, the connecting portion 18 with the main body of the optical element. This means in teris of the molding mold that a chamfering machining is given to a portion where the groove 2A for producing the projection is connected to the cavity 1A for molding the main body of the optical element.

In this respect, there is no problem whether the shape of the leading end 19 of the projection 2 is rounded or squarish, but if it is squarish, it is desirable to provide a draught in an ejecting direction from the mold used for molding operation.

Figure 5B:
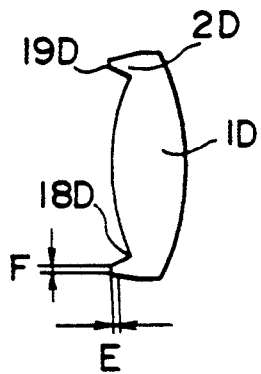

FIGS. 5A and 5B are views showing a second embodiment of a plastic molded optical element according to the present invention, in which a reference numeral 1D designates a main body of the optical element, and 2D is a projection provided accompanying the main body of the optical element according to the present invention.

Figure 6:
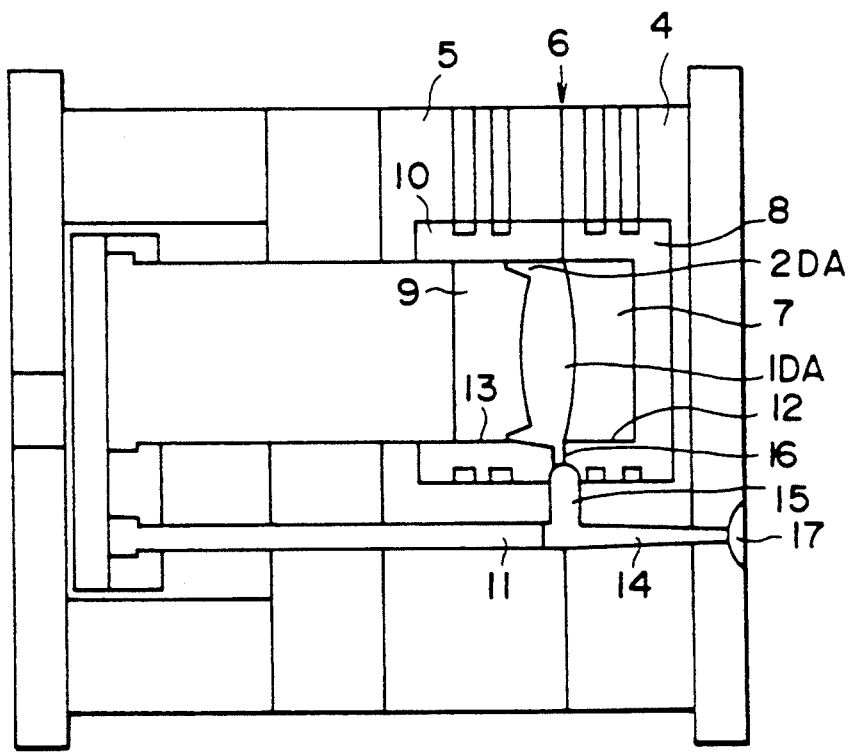
FIG. 6 is a view showing a molding mold for the optical element according to the above-mentioned another embodiment.

In order to obtain such optical element, a molding mold of a structure as shown in FIG. 6 is employed. In the aforesaid embodiment shown in FIG. 2, there is disclosed a method of ejecting an optical element from the molding mold by allowing the flange 3 to be ejected by the use of the ejector pins 11. According to the embodiment shown in FIG. 6, a disclosed method is such that the optical element is ejected directly from the mirror die 9 on the movable side. In order to slide the movable side mirror die 9 to eject the optical element, there must be a clearance required for such sliding between the movable side mirror die 9 and the die 10 which houses the mirror die. With such arrangement, there occurs a possibility that the flashes are generated on the matching portions of these molding members and dies, that is, the parting planes 13. In the embodiment shown in FIG. 6, therefore, there are provided grooves 2DA particularly at positions on the matching portions 13 of the molding members and dies constituting the molding mold. The projection 2D thus formed by such molding mold differs from the projection 2 shown in FIG. 2 and is positioned in the drawing direction of the molded product. Therefore, the thickness of the projection 2D changes in relation to the flow direction of resin because usually a draught is provided in the drawing direction. In this respect, as regards the parting planes 6, no groove is arranged in the present embodiment as a counter-measure to prevent the generation of flashes, but, if necessary, a groove can be arranged here of course so that a projection may also be provided for the periphery of the main body 1D of the optical element.

According to our studies regarding the shape of the groove 2DA corresponding to the projection 2D and the effect of the prevention of the flash generation, it is found that it is preferable to provide the portion of the groove 2DA having a thickness of less than 0.5 mm for more than 0.3 mm in view of the prevention of the flash generation. Also, in consideration of the strength of the projection 2D of the molded optical element, it is determined that the length E of the portion of the projection 2D having less than 0.5 mm should preferably be less than 2 mm.

FIG. 7 is a partial enlargement showing the molded portion 2D formed by the groove 2DA for the molded lens produced by molding mold shown in FIG. 6.

In this respect, it is unnecessary that the length of the groove corresponding to the length E of the projection 2D is a maximum of 2 mm, so it may be more than 2 mm as described earlier. Also, in consideration of the strength, it is desirable to apply a treatment of chamfering to a root of the projection 2D, that is, the connecting portion 18D with the main body 1D of the optical element. This means in teris of the molding mold that a chamfering machining is given to the portion where the groove 2DA for producing the projection is connected to the cavity 1DA for molding the main body of the optical element.

Also, in the embodiment shown in FIG. 6, the mold structure of the usual injection molding has been described, but in the case of an injection compression molding, the structure is such that the mirror die 9 is arranged to slide for compression molding. Accordingly, as in the above-mentioned embodiment, there is a possibility that flashes are generated on the matching portion between the mirror die 9 and the molding member 10 housing the mirror die, that is, the parting planes 13. Therefore, in this case, it is also necessary to machine the groove 2DA for molding the projection 2D in the same manner as the above-mentioned embodiment.

Further, in the embodiment shown in FIGS. 5A, 5B and FIG. 6, while the projection is formed only on the movable side, there is some possibility that flashes are generated in a gap, which may take place on the matching portion 12 between the mirror die 7 and the molding member 8 which houses the mirror die due to the difference in their thermal expansion coefficients even though there is no sliding between them. Consequently, depending on the structure of a molding mold or conditions of use, it may be necessary to machine a groove for forming the projection on the fixed side.

In the embodiment in FIGS. 1A and 1B, while there has been shown a case where the portion 21, which corresponds to the parting planes of the dies for molding the optical element 1, is plane, there should be a case that the portion 22 corresponding to the parting planes is curved like a circle as shown in FIG. 8B depending on the kinds of optical elements or usage. In this case, it becomes more difficult to match the molds than the case that the parting planes are flat, so flashes tend to be generated. Thus, it is particularly necessary to provide a projection 2G as shown in FIGS. 8A and 8B when the parting planes are curved.

Also, for the molding mold shown in FIG. 6, a measure to prevent the generation of flashes on the matching portions 12 and 13 of the mirror dies 7 and 9 and the molding members 8 and 10 housing them is exemplified, but the matching portions between the mold members and dies are not limited to the structure exemplified in FIG. 6. For example, if there is any structure which provides sliding die members in the molding mold, it is anticipated that flashes are generated on the matching planes of such sliding die members. Therefore, it is also necessary to machine a groove on such matching planes so that a projection is given to the molded product. An example therefor will be shown in FIG. 9 in which a reference numeral 24 designates a polygon mirror which serves as an optical element and its mirror surface 25 is the reflecting plane for laser light.

As a molding mold for molding the polygon mirror 24, the one illustrated in FIG. 11 is desirably employed. In FIG. 11, the movable side molding member is shown with the parting being open. Six (6) sliding mirror dies 27 are housed in a mold frame 28 to form a cavity 24A. The mirror dies 27 are operated with a mechanism (not shown) to slide in the direction indicated by arrows by movements for opening the mold or closing the mold. A reference numeral 29 designates matching portions of the sliding mirror dies, that is, parting planes, and it is conceivable that flashes will be generated on these matching portions 29. It is therefore possible to avoid the generation of flashes by providing the groove 26A for each of the mirror dies 27, corresponding to the projections 26 formed on the molded product.

Also, an example is shown in FIGS. 10A and 10B, in which a separate projection is provided for the main body of an optical element. A polygon mirror 30 has a projection 32 of a flange type each at both ends, and six (6) mirrors 31 (reflecting planes for laser light) are arranged between them.

Figure 12:
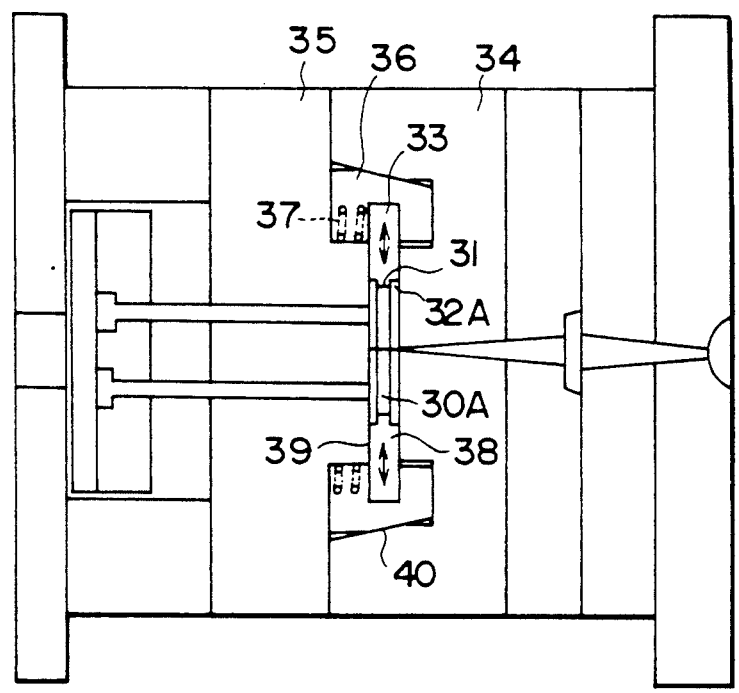
FIG. 12 is a view showing a molding mold for the embodiment shown in FIG. 10.

A molding mold for forming the polygon mirror 30 is of such a structure as shown in FIG. 12, and the six mirror dies 33 constituting a cavity 30A have a sliding structure, and slide in the direction indicated by arrows by the open and close operation of the molding mold. Then, when the molding mold is opened, the molding member 36, which houses the mirror dies 33, are moved in the direction apart from the center by means of a spring 37. When the molding mold is closed, the molding member 36 is moved in the direction toward the center of the mold by the function of a tapering plane 40 of the molding member 36, and following such movement, the mirror dies 33 are also moved in the direction toward the center. At this juncture, there is a possibility that flashes are generated on the matching portions (parting planes) 38 and 39 of the mirror dies 33 and fixed side frame 34 and movable side frame 35. Therefore, grooves 32A are provided at the leading ends of the dies 33 so as to correspond to projections 32, thereby stopping the flow of resin to prevent the flash generation.

In this respect, the thicknesses I and K of the projections 26 and 32 and its lengths H and J should desirably be in a range of 0.05 mm to 0.5 mm in thickness and 0.3 mm to 2 mm in length.

Also, the general injection molding method has been employed in molding with the molding molds shown in FIG. 2, FIG. 4, and FIG. 6, but in so-called rotary molding method in which a plurality of dies are transferred to injection step, cooling step, taking-out step and temperature rising step, there is a demand on making the mold as small as possible. Therefore, it is important to avoid exerting excessive mold clamping force because such force may result in the mold deformation. Unless this problem is solved, the mold durability will be reduced. Also, providing such a robust mold as withstanding a sufficiently strong mold clamping force results in an expensive manufacturing cost per mold, and since a number of molds should be used for this method, a mold operating mechanism for them becomes inevitably greater and more costly. Therefore, there is a significant advantage in applying the present invention to such type of molding method so that the preventive measure is taken against the flash generation by matching the groove on the parting planes of the molding members and die members in the molding mold.

The present invention is effectively applicable as a significant measure for the prevention of the flash generation not only to the injection molding of thermoplastic resin, but also to the powder molding or molding of thermosetting resin (such as epoxy resin or silicon resin). Also, in the above-mentioned embodiments, the groove is formed all over the parting planes of the molding mold to stop the flow of resin therein and to avoid generating flashes essentially. Also, a consideration is given to constructing the projection to be molded on an optical element with such strength that a damage due to any transfer operation by a mechanical hand is prevented. However, in consideration of the hardening speed of resin in the vicinity of the parting planes at the time of molding, it is conceivable that there can be a case that the flash generation is avoidable substantially by forming the groove only in the necessary portion on the parting planes. Therefore, it is to be understood that when the projection for the main body of an optical element is structured locally and the groove on the matching portions of the molding member and the die members in the molding mold is locally formed, such arrangement is included within the scope of the present invention.

FIGS. 13A, 13B and 13C are views illustrating an example in which the plastic molded optical elements (FIGS. 5A and 5B) according to the present invention are assembled into a final product.

In FIG. 13A, a zoom lens barrel for a single-lens reflection camera is shown. In this zoom lens barrel 40, a plurality of lenses $L_1$, $L_2$, and . . . are housed in a fixed barrel and a movable barrel.

The lenses $L_7$ and $L_{11}$ in FIG. 13A are those to which the present invention are applied. The lenses are fixedly bonded or held by clamping with clamping rings in lens holding barrel members 42 and 44.

In the lens holding barrel member 42, a relief groove 42a is formed at extension portion of flash for the molded lens L7.

As described above, according to the present invention, a groove is formed in a molding mold so that a projection having a required strength is formed in the main body of an optical element, corresponding to the matching portions of molds (parting planes) around the cavity for defining the main body of the optical element, of the molding mold used for plastic-molding the main body of the optical element. The plastic optical element is molded by means of the molding mold, thereby avoiding generation of flashes, and making access to the molded optical element easy when it is transferred by a mechanical hand or the like. Thus, moreover, it becomes unnecessary to exert any excessive mold clampling force so that deformation of the molding mold can be prevented to achieve a longer durability of the mold. There is also an advantage in that the mold manufacturing cost and the mold machining time are reduced.

What is claimed is:

1. An optical element molded with molten plastic resin, which is injected into a cavity within a mold and then cooled and solidified, said optical element comprising:
   an optical face; and
   a projection extending away from said optical face, wherein said projection comprises means for being formed at a groove-like resin injection portion which is provided within the mold and which is provided along a parting face of the mold and which continues to the cavity.

2. An optical element according to claim 1, wherein said optical face of the optical element comprises a toric face having different curvatures in two orthogonal directions and a face formed at the parting face of the mold, wherein said projection is provided along the face that is formed at a parting face of the optical element.

3. An optical element according to claim 1, wherein the optical element comprises a lens.

4. An optical element according to claim 1, wherein said projection has a thickness of 0.05 mm to 0.5 mm.

5. An optical element according to claim 1, wherein said projection has a length that is less than 2 mm.

6. An optical element according to claim 1, wherein said optical face and said projection are flashless.

7. An optical element molded with molten plastic resin, which is injected into a cavity within a mold and then cooled and solidified, said optical element comprising:
   an optical face;
   a mirror, which comprises a reflection portion for reflecting at least one of light and a laser beam; and
   a projection extending away from said optical face,
   wherein said projection is formed at a groove-like resin injection portion which is provided within the mold and which is provided along a parting face of the mold and which continues to the cavity, and
   wherein said projection is formed by a groove portion provided within the mold which continues to a parting face of a mirror die which forms the cavity in which the mirror is molded.

8. A mold for molding an optical element by injecting molten plastic resin material, the mold comprising:
   a groove portion for forming a projection along a parting face of the optical element which is molded within a cavity by which a shape of the optical element is defined, the groove portion continuing to a parting face of the mold between a movable side and a stationary side of the mold which forms the cavity,
   wherein flash on the parting face of the optical element is provided by injection of the resin into the groove portion.

* * * * *

UNITED STATES PATENT AND TRADEMARK OFFICE
CERTIFICATE OF CORRECTION

PATENT NO. : 5,329,406
DATED : July 12, 1994
INVENTOR(S) : HIROSHI NAKANISHI et al.

It is certified that error appears in the above-indentified patent and that said Letters Patent is hereby corrected as shown below:

<u>COLUMN 4</u>:
    Line 39,     "knowledges" should read --knowledge--.

<u>COLUMN 5</u>:
    Line 45,     "teris" should read --terms--.

<u>COLUMN 6</u>:
    Line 45,     "teris" should read --terms--.

<u>COLUMN 10</u>:
    Line 8,     "claim 1," should read --claim 4,--.
    Line 36,    "forms" should read --form--.
    Line 39,    "provided" should read --prevented--.

Signed and Sealed this

First Day of November, 1994

Attest:

BRUCE LEHMAN

*Attesting Officer*               *Commissioner of Patents and Trademarks*